Patented Oct. 24, 1939

2,177,579

UNITED STATES PATENT OFFICE 2,177,579

CATALYTIC CONDENSATION OF HYDROCARBONS

Roderick Donald Pinkerton, Chicago, Ill., and William Mendius, Munster, Ind., assignors to Sinclair Refining Company, New York, N. Y., a corporation of Maine No Drawing. Application April 28, 1938, Serial No. 204,736

10 Claims. (Cl. 196—10)

This invention relates to improvements in the catalytic condensation of normally gaseous hydrocarbons to produce normally liquid hydrocarbons of gasoline boiling range.

The normally gaseous hydrocarbons to which we refer more particularly are those saturated, or paraffine, and unsaturated, or olefine, hydrocarbons containing four and less carbon atoms per molecule, methane, ethane, ethylene, propane, propylene, normal butane, isobutane, normal butylene and isobutylene. These hydrocarbons may be designated the $C_1$, $C_2$, $C_3$ and $C_4$ compounds, or collectively the $C_{4-}$ compounds. The normally liquid hydrocarbons to which we refer are those containing five or six or more carbon atoms per molecule within the boiling range of gasoline, which may be designated the $C_{5+}$ or the $C_{6+}$ compounds.

The term "catalytic condensation" as applied to such hydrocarbons includes polymerization of unsaturates and alkylation or reaction between saturates and unsaturates. Catalytic polymerization of unsaturates has been proposed, and practiced, as a method of recovering motor fuel gasoline of special value from less valuable hydrocarbon gas mixtures containing sufficient unsaturated components. Gas mixtures so processed have included gas mixtures from cracking operations containing as produced sufficient unsaturated components and gas mixtures preliminarily processed, catalytically or thermally, to produce sufficient unsaturated components by decomposition of saturated components. While some of these previous proposals and practices have involved incidental alkylation, the conditions of operation have tended to suppress alkylation rather than to promote this type of reaction. Alkylation and polymerization are, in some respects, inconsistent reactions, and consequently it is not unnatural that those seeking to effect condensation by polymerization should have avoided conditions promoting alkylation.

We have discovered that, by appropriate correlation of charging stock, temperature, pressure and catalyst, we can effect condensation with substantial alkylation, either with concurrent polymerization or to the substantial exclusion of polymerization. By means of this correlation the process of our invention effects catalytic condensation of mixtures of normally gaseous hydrocarbons including saturates and unsaturates to produce gasoline-like hydrocarbon products, superior in important respects to those of polymerization processes in which alkylation if occurring at all is merely incidental, with several important process advantages.

In carrying out the process of our invention, we pass a mixture of normally gaseous hydrocarbons consisting predominantly of $C_{4-}$ hydrocarbons containing not less than about 40 mol percent. of ethane, propane and butanes, advantageously not less than about 15, or better 20, mol percent. of ethane and propane and not more than about 25, or better 22, mol percent. of normal butylene and isobutylene on its total content of $C_{4-}$ hydrocarbons in contact with a phosphoric acid catalyst at a temperature of about 200°–450° F., or better about 200°–360° F., under a pressure upwards of about 500 pounds per square inch, or better upwards of about 700 pounds per square inch, and we thereby effect substantial condensation of saturates and unsaturates, that is we effect substantial condensation by alkylation. The ethylene, propylene and butylene content of the gaseous hydrocarbons subjected to the catalyst contact is with advantage limited to about 40, or better 35, mol percent. on their total content of $C_{4-}$ hydrocarbons. The ethane content of this mixture of gaseous hydrocarbons is with advantage controlled so that it is not less than about 3, or better 6, mol percent. of its total content of $C_{4-}$ hydrocarbons.

In our process, using a phosphoric acid catalyst, correlation of charging stock composition, temperature and pressure are important, but of these three factors correlation of charging stock composition and temperature appear to be more important, or at least more critical, than the pressure. As previously noted, alkylation reactions and polymerization reactions are inconsistent in some respects. In particular, olefins may react either with olefins or with paraffins, whereas the paraffins react only with olefins. Consequently, with a charging stock of given composition, olefins become less available for reaction with paraffins to the extent that they react with each other. In carrying out our process, polymerization is suppressed at least to the extent to which it interferes with substantial alkylation.

We have discovered that the paraffins are apparently more reactive with respect to alkylation as they decrease in molecular size. Specifically, we have found that propane is more reactive with respect to alkylation than are the butanes and that ethane is in turn more reactive than propane. The olefins, on the other hand, appear to be more reactive with respect to polymerization as their molecular size increases, at least within the range of normally gaseous hydrocarbons. We have also found that lower temperatures tend to promote alkylation and to suppress polymerization whereas higher temperatures, at least within the range in which alkylation might otherwise be effected, tend to promote polymerization and to suppress alkylation. In our process, the composition of the charging stock and the temperature of catalyst contact are further interrelated in that, with any given temperature, alkylation can also be promoted by lowering the concentration of olefins in the gas mixture, by lowering the concentration of olefins more reactive with respect to polymerization in the gas mixture or by increasing the concentration of paraffins more reactive with respect to alkylation in the gas mixture.

In the process of our invention, these several factors are correlated as follows: The temperature of catalyst contact is limited to a range within which substantial alkylation can be effected. At temperatures above about 330°–360° F. consumption of olefins in polymerization begins to interfere with the alkylation reaction particularly if the gas mixture includes a substantial content of olefins more reactive with respect to polymerization. Temperatures above about 450° F. do not appear to be useful if substantial alkylation is to be effected. At temperatures below about 200° F., difficulties are encountered with respect to control of moisture content of the catalyst, softening of the catalyst and the stripping of condensation products from the catalyst. The composition of the charging stock is controlled, with respect to the temperature of catalyst contact and the pressure, to promote alkylation and to limit polymerization impeding effective alkylation. The charging stock composition is controlled to include not less than about 40 mol percent. of ethane, propane and butanes on its total content of $C_4$- hydrocarbons and, with advantage, to contain not less than about 15, or 20, mol percent. of paraffins more reactive with respect to alkylation, ethane and propane, on its total content of $C_4$- hydrocarbons, and with advantage not less than about 3, or 6, mol percent. of ethane, particularly reactive with respect to alkylation, on its total content of $C_4$- hydrocarbons. The charging stock composition is controlled to include a substantial proportion but not more than about 22 or 25 mol percent. of olefins more reactive with respect to polymerization, the butylenes, on its total content of $C_4$- hydrocarbons and, with advantage, a substantial proportion but not more than about 35 or 40 mol percent. of ethylene, propylene and butylenes on its total content of $C_4$- hydrocarbons. Pressures upwards of about 500 pounds per square inch are useful in our process. In this range, somewhat higher pressures appear to be more useful than the lower pressures. Such higher pressures, upwards of about 700 pounds per square inch for example, may assist in suppressing polymerization and promoting alkylation.

The period of catalyst contact is not critical. It must be sufficient to effect the desired reactions, but it appears to have little if any part in the distribution of olefin consumption between polymerization reactions and alkylation reactions. Prolonged periods of catalyst contact may involve some alkylation of condensation products originally produced by polymerization. Within the region of catalyst contact, the hydrocarbons present may exist in liquid phase, in vapor phase or in a mixture of liquid and vapor phases. The relatively low temperatures and the relatively high pressures used in our process tend towards the maintenance of at least some liquid material within the region of catalyst contact, and some incidental advantages flow from this circumstance to the extent that such liquid phase conditions exist.

We use the known phosphoric acid condensation catalysts in carrying out our process. An appropriate phosphoric acid catalyst may be prepared, for example, by mixing orthophosphoric acid or pyrophosphoric acid with an appropriate carrier, siliceous materials such as kieselguhr or an aluminum silicate for example, and calcining the mixture at a temperature of 350°–750° F. The calcined catalyst may comprise three parts by weight of the phosphoric acid compound and one part by weight of the carrier, for example. The calcined mixture may be ground and sized or pelleted or some carbonaceous material may be incorporated into the mixture prior to calcination to render the calcination product porous.

Special apparatus for carrying out the process of our invention is not necessary. The catalyst contact chamber may be of any conventional design appropriate to effect thorough contact between the catalyst arranged within the chamber and the charge passed therethrough and may be provided with any conventional means for maintenance and control of the proper temperature conditions therein. As a matter of catalyst economy, the charge is with advantage preheated to the reaction temperature prior to its introduction into the catalyst chamber. Heat exchange between the charge and materials flowing through other parts of the system may be utilized in such preheating as may be expedient in any particular system. Conventional recovery and fractionation equipment may be used to collect and separate the liquid hydrocarbon product of gasoline boiling range.

The following examples, specific operations embodying our invention, will further illustrate the process of our invention:

In the following tabulation, operating conditions are given in the first four lines, A being the temperature in ° F., B being the pressure in pounds per square inch gauge, C being the feed rate in gallons per pound of catalyst per hour, and D being the contact time in hours, the olefin content of the $C_4$- component of the charge and the extent to which these olefins reacted are given in the next ten lines, E and F being, respectively, the mol percent. in the charge and the mol percent. reacted of ethylene, G and H being, respectively, the mol percent. in the charge and the mol percent. reacted of propylene, I and J being, respectively, the mol percent. in the charge and the mol per cent. reacted of isobutylene, K and L being, respectively, the mol percent. in the charge and the mol percent. reacted of normal butylene and M and N being, respectively, the total mol percent. in the charge and total mol percent. reacted of $C_4$- olefins, the paraffin content of the $C_4$- component of the charge is given in the next eight lines, O and P being, respectively, the mol percent. in the charge and the mol percent. reacted of ethane, Q and R being, respectively, the mol percent. in the charge and the mol percent. reacted of propane, S and T being, respectively, the mol percent. in the charge and the mol percent. reacted of butanes, and U and V being, respectively, the total mol percent. in the charge and the total mol percent. reacted of $C_4$- paraffins, the mol percent. on the total charge of $C_4$+ compounds is given in line W, the proportion of the total charge reacted in mol percent. on its total content of C₄₋ hydrocarbons is given in line X and the percent. reacted by alkylation is given in line Y.

| | Example— | | | |
|---|---|---|---|---|
| | I | II | III | IV |
| A | 295 | 295 | 295 | 280 |
| B | 700 | 700 | 700 | 700 |
| C | 0.310 | .291 | .057 | .104 |
| D | 0.16 | .10 | .62 | .51 |
| E | 1.29 | 1.12 | .34 | .34 |
| F | 90 | 75 | 68 | 78 |
| G | 6.59 | 8.33 | 7.74 | 7.74 |
| H | 74 | 77 | 95 | 87 |
| I | 5.78 | 7.39 | 5.89 | 5.89 |
| J | 90 | 98 | 91 | 86 |
| K | 14.07 | 14.74 | 14.91 | 14.91 |
| L | 27 | 39 | 57 | 52 |
| M | 27.73 | 31.58 | 28.88 | 28.88 |
| N | 54 | 64 | 74 | 69 |
| O | 3.05 | 4.88 | 6.84 | 6.84 |
| P | 72 | 51 | 88 | 90 |
| Q | 16.61 | 15.67 | 15.43 | 15.43 |
| R | 38 | 46 | 43 | 33 |
| S | 27.54 | 27.50 | 27.92 | 27.92 |
| T | 9 | 9 | 13 | −5 |
| U | 47.20 | 48.05 | 50.19 | 50.19 |
| V | 22.0 | 25.8 | 32.5 | 19.5 |
| W | 25.07 | 20.37 | 20.93 | 20.93 |
| X | 25.5 | 32.6 | 37.8 | 29.6 |
| Y | 81 | 76 | 86 | 66 |

| | Example— | | | |
|---|---|---|---|---|
| | V | VI | VII | VIII |
| A | 330 | 320 | 320 | 400 |
| B | 700 | 700 | 1000 | 1000 |
| C | .117 | .099 | .094 | .178 |
| D | 0.28 | 0.32 | 0.37 | .07 |
| E | .72 | .40 | .80 | 0.26 |
| F | 90 | 68 | 75 | 81 |
| G | 7.68 | 6.05 | 8.93 | 5.68 |
| H | 97 | 95 | 96 | 97 |
| I | 6.78 | 6.00 | 6.61 | 10.79 |
| J | 95 | 97 | 94 | 98 |
| K | 13.73 | 13.62 | 14.29 | 20.23 |
| L | 74 | 75 | 72 | 85 |
| M | 28.91 | 26.07 | 30.63 | 36.96 |
| N | 85 | 84 | 84 | 91 |
| O | 4.24 | 2.94 | 4.86 | 1.16 |
| P | 88 | 39 | 45 | 20 |
| Q | 14.84 | 14.75 | 17.34 | 13.18 |
| R | 51 | 24 | 20 | 7.3 |
| S | 22.39 | 23.21 | 24.04 | 48.70 |
| T | 8 | 3 | 9 | 2.1 |
| U | 41.47 | 40.90 | 46.24 | 63.04 |
| V | 31 | 13.4 | 17.3 | 3.6 |
| W | 29.62 | 33.03 | 23.15 | 0 |
| X | 37.5 | 27.5 | 33.8 | 35.7 |
| Y | 69 | 40 | 47 | 13 |

| | Example— | | | |
|---|---|---|---|---|
| | IX | X | XI | XII |
| A | 360 | 320 | 305 | 205 |
| B | 1000 | 1000 | 1000 | 1000 |
| C | 0.099 | 0.091 | 0.103 | 0.182 |
| D | .13 | 0.33 | 0.30 | .34 |
| E | 0.11 | 0.08 | 0.25 | 0.25 |
| F | 69 | 14 | 55 | 53 |
| G | 4.10 | 5.06 | 5.78 | 5.78 |
| H | 82 | 76 | 78 | 53 |
| I | 9.74 | 9.98 | 9.29 | 9.29 |
| J | 9.6 | 96 | 96 | 92 |
| K | 23.92 | 22.88 | 18.90 | 18.90 |
| L | 65 | 52 | 45 | 19 |
| M | 37.87 | 38.00 | 34.22 | 34.22 |
| N | 75 | 67 | 65 | 45 |
| O | 0.54 | 0.72 | 1.23 | 1.23 |
| P | 39 | 21 | 32 | 44 |
| Q | 11.31 | 13.02 | 14.00 | 14.00 |
| R | 13 | 6.2 | 6.7 | 14 |
| S | 50.28 | 48.26 | 50.55 | 50.55 |
| T | 0.25 | 1.3 | 2.1 | 5.6 |
| U | 62.13 | 62.00 | 65.78 | 65.78 |
| V | 3.0 | 2.5 | 3.6 | 8.3 |
| W | 0 | 0 | 0 | 0 |
| X | 30.2 | 26.8 | 24.62 | 20.69 |
| Y | 12 | 12 | 19 | 52 |

| | Example— | | | |
|---|---|---|---|---|
| | XIII | XIV | XV | XVI |
| A | 200 | 250 | 250 | 250 |
| B | 1000 | 1000 | 700 | 700 |
| C | 0.045 | 0.044 | 0.044 | 0.054 |
| D | 1.31 | 1.25 | 1.25 | 0.64 |
| E | 0.11 | 0.28 | 0.28 | |
| F | −0.5 | 62 | 70 | |
| G | 4.49 | 7.37 | 7.37 | 4.59 |
| H | 50 | 49 | 64 | 59 |
| I | 9.92 | 12.25 | 12.25 | 10.92 |
| J | 82 | 75 | 91 | 97 |
| K | 19.65 | 20.48 | 20.48 | 22.30 |
| L | 1.9 | 18 | 30 | 33 |
| M | 34.17 | 40.38 | 40.38 | 37.81 |
| N | 31 | 41 | 55 | 55 |
| O | 0.91 | 1.62 | 1.62 | |
| P | 59 | 53 | 66 | |
| Q | 14.50 | 17.85 | 17.85 | 11.85 |
| R | 17 | 13 | 12 | 3.1 |
| S | 50.42 | 40.15 | 40.15 | 49.65 |
| T | 1.3 | −1.7 | −1.3 | 6.7 |
| U | 65.83 | 59.62 | 59.62 | 61.50 |
| V | 5.6 | 2.4 | 4.5 | 6.1 |
| W | 0 | 0 | 0 | .69 |
| X | 14.43 | 18.07 | 24.79 | 24.43 |
| Y | 51 | 16 | 22 | 31 |

| | Example— | | | |
|---|---|---|---|---|
| | XVII | XVIII | XIX | XX |
| A | 250 | 300 | 300 | 320 |
| B | 500 | 700 | 700 | 1000 |
| C | 0.044 | 0.044 | 0.089 | 0.091 |
| D | 1.29 | 1.16 | .59 | 0.36 |
| E | 0.52 | 0.52 | 0.52 | d 0.31 |
| F | 55 | 58 | 76 | −9.1 |
| G | 8.68 | 8.68 | 8.68 | 6.89 |
| H | 77 | 83 | 80 | 78 |
| I | 6.72 | 6.72 | 6.72 | 5.40 |
| J | 97 | 94 | 95 | 94 |
| K | 14.62 | 14.62 | 14.62 | 14.43 |
| L | 41 | 42 | 37 | 52 |
| M | 30.54 | 30.54 | 30.54 | 27.03 |
| N | 64 | 65 | 63 | 66 |
| O | 3.24 | 3.24 | 3.24 | 6.54 |
| P | 31 | 30 | 70 | 48 |
| Q | 15.72 | 15.72 | 15.72 | 13.90 |
| R | 16 | 16 | .30 | −1.7 |
| S | 25.00 | 25.00 | 25.00 | 24.38 |
| T | 10 | 5.9 | 4.3 | 6.8 |
| U | 43.96 | 43.96 | 43.96 | 44.82 |
| V | 13.9 | 11.2 | 18.4 | 10 |
| W | 25.50 | 25.50 | 25.50 | 28.15 |
| X | 25.66 | 24.91 | 27.23 | 22.4 |
| Y | 48 | 40 | 59 | 41 |

| | Example— | | |
|---|---|---|---|
| | XXI | XXII | XXIII |
| A | 330 | 330 | 330 |
| B | 1000 | 700 | 500 |
| C | 0.076 | 0.074 | 0.071 |
| D | 0.43 | 0.42 | .11 |
| E | 0.52 | 0.39 | 0.21 |
| F | 42 | 7.9 | 12 |
| G | 6.98 | 6.58 | 5.26 |
| H | 78 | 59 | 30 |
| I | 6.72 | 6.79 | 7.14 |
| J | 94 | 89 | 81 |
| K | 14.86 | 14.59 | 13.18 |
| L | 49 | 22 | 16 |
| M | 29.08 | 28.35 | 25.79 |
| N | 66 | 46 | 37 |
| O | 3.88 | 8.46 | 3.60 |
| P | 8.2 | 62 | 49 |
| Q | 15.36 | 13.79 | 13.80 |
| R | 14 | 4.9 | −1.1 |
| S | 26.38 | 22.19 | 43.42 |
| T | 2.1 | 9.9 | 5.1 |
| U | 45.62 | 44.44 | 60.82 |
| V | 6.7 | 18 | 6.3 |
| W | 25.30 | 27.21 | 13.39 |
| X | 22.3 | 21.2 | 14.3 |
| Y | 27 | 76 | 56 |

In the foregoing tabulation, the proportions of C₄₋ olefins, of C₄₋ paraffins and of C₅+ hydrocarbons, saturated and unsaturated, are given in mol percent. on the total hydrocarbon content of the gas mixture subjected to catalyst contact.

These determinations of the composition of the hydrocarbon mixture charged and the hydrocarbon mixture produced were made by fractional distillation of about 50 cubic centimeters (liquid volume) of the hydrocarbon mixture in a still equipped with a highly efficient fractionating column followed by fractional extraction of olefins from the fractions separated by distillation with sulphuric acid of appropriately controlled concentration. In the fractional distillation, $C_1$ compounds were separated as the first overhead fraction, $C_2$ compounds as a second, $C_3$ compounds as a third, $C_4$ compounds as the fourth and $C_5$ compounds as the fifth. These fractions were collected as gases, the $C_5$ fractions being collected at a reduced pressure in order to maintain it in vapor phase. The volumes of each fraction were measured and corrected to volume at 60° F. under 760 mm. of mercury. The olefinic content of each fraction, with the exception of the $C_5$ fraction, was determined by absorption in sulphuric acid, the ethylene in the $C_2$ fraction by absorption in 104.5% $H_2SO_4$, the propylene in the $C_3$ fraction by absorption in 86% $H_2SO_4$, the isobutylene in the $C_4$ fraction by absorption in 58% $H_2SO_4$ and the normal butylene in the $C_4$ fraction by absorption in 86% $H_2SO_4$ after removal of isobutylene. The $C_{5+}$ fraction was removed from the still as a liquid residue, the volume of this liquid residue and its molecular weight were determined, and its gas volume at 60° F. under 760 mm. of mercury then computed. Mol percent. were taken as identical with gas volume percent. The quantity of hydrogen consumed in hydrogenating a weighed sample of the liquid product was measured, complete hydrogenation was tested for by determination of the bromine addition value on the hydrogenated sample, and the molecular weight of the liquid product sample was determined to determine the proportion of paraffin and olefins in the liquid product.

The gasoline-like condensation product of the process of our invention usually exhibits higher octane values than products derived from the same mixtures of normally gaseous hydrocarbon by polymerization without substantial alkylation. The products of our invention also usually exhibit a substantially better blending value. These characteristics of the products of our invention materially increase their value. By "octane value" we refer to the octane number determined by the Cooperative Fuel Research Motor Method. By "blending value" we refer to the apparent octane value of the product in blends with other gasolines of known lower octane value. The product of our process is also more saturated than the comparable product produced by polymerization without substantial alkylation. This quality of the product is usually determined by its bromine addition number. Olefins react with olefins, polymerization, tending to produce an unsaturated product, whereas olefins react with paraffins, alkylation, tending to produce a saturated product.

One advantage of our process is improved yield. Our invention makes possible the recovery of yields substantially larger than could be had from polymerization of unsaturates to the substantial exclusion of alkylation. Our invention enables the recovery of yields deriving as much as 15%—45% or more from saturates. Another advantage of our process resides in the fact that it makes available, for the production of liquid gasoline-like products, hydrocarbon materials which hitherto either could not be so used at all or could not be so used economically. Our process derives special advantage from the fact that ethane and propane, particularly, are thus recoverable as liquid gasoline-like products. Butane, for example, can be dehydrogenated and the resulting unsaturated products then catalytically polymerized, or it can be polymerized by thermal processes involving decomposition as well as polymerization. Propane is not readily handled by these methods applicable to butane, and ethane cannot be handled by either method. Substantial proportions of butane, moreover, can also be included in liquid motor fuels, to provide proper vapor pressure characteristics, whereas ethane and propane are not useful in this manner. In this aspect, our process provides for the recovery of a valuable liquid product from such saturated hydrocarbons, ethane and propane particularly, which hitherto have had little if any more than fuel value.

To the extent that liquid phase conditions are maintained in the region of catalyst contact, our process enjoys several further incidental advantages. High capacities per unit of given size are thus attained. The catalyst is thus subjected to more or less continuous washing. Heavier condensation products which resist desorption in vapor phase operation, thus tending to limit the effect of the catalyst as a matter of displacement, are thus removed. Such washing, in conjunction with the lower temperatures used, also appears to prolong the useful life of the phosphoric acid catalyst.

We claim:

1. In the catalytic condensation of normally gaseous hydrocarbons including saturates and unsaturates to produce normally liquid hydrocarbons of gasoline boiling range, the improvement which comprises passing a mixture of such hydrocarbons consisting predominantly of $C_4$- hydrocarbons containing not less than about 40 mol percent. of ethane, propane and butanes and a substantial proportion but not more than about 25 mol percent. of normal butylene and isobutylene on its total content of $C_4$- hydrocarbons in contact with a phosphoric acid catalyst at a temperature of about 200°–450° F. under a pressure upwards of about 500 pounds per square inch, whereby substantial alkylation is effected.

2. In the catalytic condensation of normally gaseous hydrocarbons including saturates and unsaturates to produce normally liquid hydrocarbons of gasoline boiling range, the improvement which comprises passing a mixture of such hydrocarbons consisting predominantly of $C_4$- hydrocarbons containing not less than about 40 mol percent. of ethane, propane and butanes, not less than about 15 mol percent. of ethane and propane and a substantial proportion but not more than about 25 mol percent. of normal butylene and isobutylene on its total content of $C_4$- hydrocarbons in contact with a phosphoric acid catalyst at a temperature of about 200°–450° F. under a pressure upwards of about 500 pounds per square inch, whereby substantial alkylation is effected.

3. In the catalytic condensation of normally gaseous hydrocarbons, including saturates and unsaturates to produce normally liquid hydrocarbons of gasoline boiling range, the improvement which comprises passing a mixture of such hydrocarbons consisting predominantly of $C_4$- hydrocarbons containing not less than about 40 mol percent. of ethane, propane and butanes and a substantial proportion but not more than about 25 mol percent. of normal butylene and isobutylene on its total content of C₄₋ hydrocarbons in contact with a phosphoric acid catalyst at a temperature of about 200°–360° F. under a pressure upwards of about 700 pounds per square inch, whereby substantial alkylation is effected.

4. In the catalytic condensation of normally gaseous hydrocarbons including saturates and unsaturates to produce normally liquid hydrocarbons of gasoline boiling range, the improvement which comprises passing a mixture of such hydrocarbons consisting predominantly of C₄₋ hydrocarbons containing not less than about 40 mol percent. of ethane, propane and butanes, not less than about 20 mol percent. of ethane and propane and a substantial proportion but not more than about 22 mol percent. of normal butylene and isobutylene on its total content of C₄₋ hydrocarbons in contact with a phosphoric acid catalyst at a temperature of about 200°–360° F. under a pressure upwards of about 700 pounds per square inch, whereby substantial alkylation is effected.

5. In the catalytic condensation of normally gaseous hydrocarbons including saturates and unsaturates to produce normally liquid hydrocarbons of gasoline boiling range, the improvement which comprises passing a mixture of such hydrocarbons consisting predominantly of C₄₋ hydrocarbons containing not less than about 40 mol percent. of ethane, propane and butanes and a substantial proportion but not more than about 40 mol percent. of ethylene, propylene and butylenes on its total content of C₄₋ hydrocarbons in contact with a phosphoric acid catalyst at a temperature of about 200°–450° F. under a pressure upwards of about 500 pounds per square inch, whereby substantial alkylation is effected.

6. In the catalytic condensation of normally gaseous hydrocarbons including saturates and unsaturates to produce normally liquid hydrocarbons of gasoline boiling range, the improvement which comprises passing a mixture of such hydrocarbons consisting predominantly of C₄₋ hydrocarbons containing not less than about 40 mol percent. of ethane, propane and butanes, not less than about 15 mol percent. of ethane and propane and a substantial proportion but not more than about 40 mol percent. of ethylene, propylene and butylenes on its total content of C₄₋ hydrocarbons in contact with a phosphoric acid catalyst at a temperature of about 200°–450° F. under a pressure upwards of about 500 pounds per square inch, whereby substantial alkylation is effected.

7. In the catalytic condensation of normally gaseous hydrocarbons including saturates and unsaturates to produce normally liquid hydrocarbons of gasoline boiling range, the improvement which comprises passing a mixture of such hydrocarbons consisting predominantly of C₄₋ hydrocarbons containing not less than about 40 mol percent. of ethane, propane and butanes and a substantial proportion but not more than about 40 mol percent. of ethylene, propylene and butylenes on its total content of C₄₋ hydrocarbons in contact with a phosphoric acid catalyst at a temperature of about 200°–360° F. under a pressure upwards of about 700 pounds per square inch, whereby substantial alkylation is effected.

8. In the catalytic condensation of normally gaseous hydrocarbons including saturates and unsaturates to produce normally liquid hydrocarbons of gasoline boiling range, the improvement which comprises passing a mixture of such hydrocarbons consisting predominantly of C₄₋ hydrocarbons containing not less than about 40 mol percent. of ethane, propane and butanes, not less than about 15 mol percent. of ethane and propane, a substantial proportion but not more than about 35 mol percent. of ethylene, proplyene and butylenes, and not more than about 25 mol percent. of normal butylene and isobutylene on its total content of C₄₋ hydrocarbons in contact with a phosphoric acid catalyst at a temperature of about 200°–450° F. under a pressure upwards of about 500 pounds per square inch, whereby substantial alkylation is effected.

9. In the catalytic condensation of normally gaseous hydrocarbons including saturates and unsaturates to produce normally liquid hydrocarbons of gasoline boiling range, the improvement which comprises passing a mixture of such hydrocarbons consisting predominantly of C₄₋ hydrocarbons containing not less than about 40 mol percent. of ethane, propane and butanes, not less than about 3 mol percent. of ethane and a substantial proportion but not more than about 35 mol percent. of ethylene, propylene and butylenes on its total content of C₄₋ hydrocarbons in contact with a phosphoric acid catalyst at a temperature of about 200°–450° F. under a pressure upwards of about 500 pounds per square inch, whereby substantial alkylation is effected.

10. In the catalytic condensation of normally gaseous hydrocarbons including saturates and unsaturates to produce normally liquid hydrocarbons of gasoline boiling range, the improvement which comprises passing a mixture of such hydrocarbons consisting predominantly of C₄₋ hydrocarbons containing not less than about 40 mol percent. of ethane, propane and butanes, not less than about 6 mol per cent. of ethane and a substantial proportion but not more than about 35 mol percent. of ethylene, propylene and butylenes on its total content of C₄₋ hydrocarbons in contact with a phosphoric acid catalyst at a temperature of about 200°–450° F. under a pressure upwards of about 500 pounds per square inch, whereby substantial alkylation is effected.

RODERICK DONALD PINKERTON.
WILLIAM MENDIUS.